United States Patent
Hsiao et al.

(10) Patent No.: US 7,611,649 B2
(45) Date of Patent: *Nov. 3, 2009

(54) NANOPOWDERS SYNTHESIS APPARATUS AND METHOD

(75) Inventors: Bor-Yuan Hsiao, Tu-Cheng (TW); Chi-Chuang Ho, Tu-Cheng (TW); Chuan-De Huang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 615 days.

This patent is subject to a terminal disclaimer.

(21) Appl. No.: 11/432,207

(22) Filed: May 10, 2006

(65) Prior Publication Data
US 2007/0063364 A1    Mar. 22, 2007

(30) Foreign Application Priority Data
Sep. 13, 2005    (CN)    ......... 2005 1 0037310

(51) Int. Cl.
*B29B 9/00*    (2006.01)

(52) U.S. Cl. ............... 264/5; 264/13; 264/14; 425/6; 425/10; 977/896

(58) Field of Classification Search ............ None
See application file for complete search history.

(56) References Cited

U.S. PATENT DOCUMENTS
6,787,231 B1    9/2004    Furman et al.
2006/0244164 A1*  11/2006    Didenko et al. ........ 264/14

FOREIGN PATENT DOCUMENTS
CN    1400044 A    3/2003

* cited by examiner

*Primary Examiner*—Mary Lynn F Theisen
(74) *Attorney, Agent, or Firm*—Frank R. Niranjan

(57) ABSTRACT

A nanopowders synthesis apparatus includes a reaction chamber; a first sprayer communicated with the reaction chamber and configured for spraying a first reactant into the reaction chamber along a first direction; and a second sprayer communicated with the reaction chamber and configured for spraying a second reactant into the reaction chamber along a second direction. A nanopowders synthesis method is also provided.

17 Claims, 2 Drawing Sheets

NANOPOWDERS SYNTHESIS APPARATUS AND METHOD

CROSS REFERENCE

This application is related to a co-pending U.S. Patent Application, entitled "APPARATUS AND METHOD FOR MAKING NANOPOWDER," filed on Jul. 25, 2006 with application Ser. No. 11/309,311, and to another co-pending U.S. Patent Application, entitled "NANOPOWDERS SYNTHESIS APPARATUS," filed on May 10, 2006 with application Ser. No. 11/432,422. Such two applications have the same inventors and assignee as the present application. The disclosures of the two applications are incorporated by reference herein.

TECHNICAL FIELD

The present invention relates to nanopowder apparatuses, and more particularly to a nanopowder synthesis apparatus and a method for synthesizing nanopowders using the apparatus.

BACKGROUND

Nanomaterials can be divided into four categories as nanopowders, nanofibers, nanofilms and nanoblocks. Nanofilms and nanoblocks are generally formed by nanopowders. Therefore, the synthesis of nanopowders is very important. Synthesis techniques for nanopowders can be generally divided into vapor deposition methods and liquid deposition methods. Vapor deposition methods can be used to form high-purity nanopowders. However, vapor deposition methods have relatively low production capabilities and require high energy consumptions, and thereby are seldom used. Among liquid deposition methods, a typical precipitation reaction method is widely used. The precipitation reaction method is advantageous to accurately control composition of a compound during processing, can achieve uniform mixing at the atomic or molecular level, and can be employed for synthesizing particles of single composition or multi-constituent compounds.

However, the precipitation reaction method is generally accomplished in an agitator tank or a stirred-tank reactor. In the agitator tank or the stirred-tank reactor, precipitation reactions cannot react substantially, and utilization ratios of reactants are relatively low. In addition, sizes of particles are relatively big, liquid-liquid mixings on the micro level cannot be mixed uniformly. Nanopowders cannot disperse uniformly and are prone to be congregated, which results big particle sizes of the nanopowders.

What is needed, therefore, is a nanopowder synthesis apparatus which synthesizes super-minute nanopowders.

What is also needed, therefore, is a nanopowder synthesis method which synthesizes super-minute nanopowders.

SUMMARY

In a preferred embodiment, a nanopowder synthesis apparatus includes a reaction chamber; a first sprayer communicated with the reaction chamber and configured for spraying a first reactant into the reaction chamber along a first direction; and a second sprayer communicated with the reaction chamber and configured for spraying a second reactant into the reaction chamber along a second direction intersecting to the first direction.

In another preferred embodiment, a nanopowder synthesis method includes the steps of: providing a reaction chamber, a first sprayer and a second sprayer communicated with the reaction chamber respectively; spraying a first reactant into the reaction chamber along a first direction by the first sprayer; and spraying a second reactant into the reaction chamber along a second direction intersecting to the first direction by the second sprayer to react with the first reactant and forming nanopowders therefrom.

Other advantages and novel features will become more apparent from the following detailed description when taken in conjunction with the accompanying drawings, in which:

BRIEF DESCRIPTION OF THE DRAWINGS

Many aspects of the present apparatus and method for synthesizing nanopowders can be better understood with reference to the following drawings. The components in the drawings are not necessarily to scale, the emphasis instead being placed upon clearly illustrating the principles of the present apparatus and method. Moreover, in the drawings, like reference numerals designate corresponding parts throughout the several views.

The exemplifications set out herein illustrate at least one preferred embodiment, in one form, and such exemplifications are not to be construed as limiting the scope of the present apparatus and method for synthesizing nanopowders in any manner.

DETAILED DESCRIPTION OF PREFERRED EMBODIMENTS

Embodiments of the present invention will now be described in detail below and with reference to the drawings.

Figure 1:
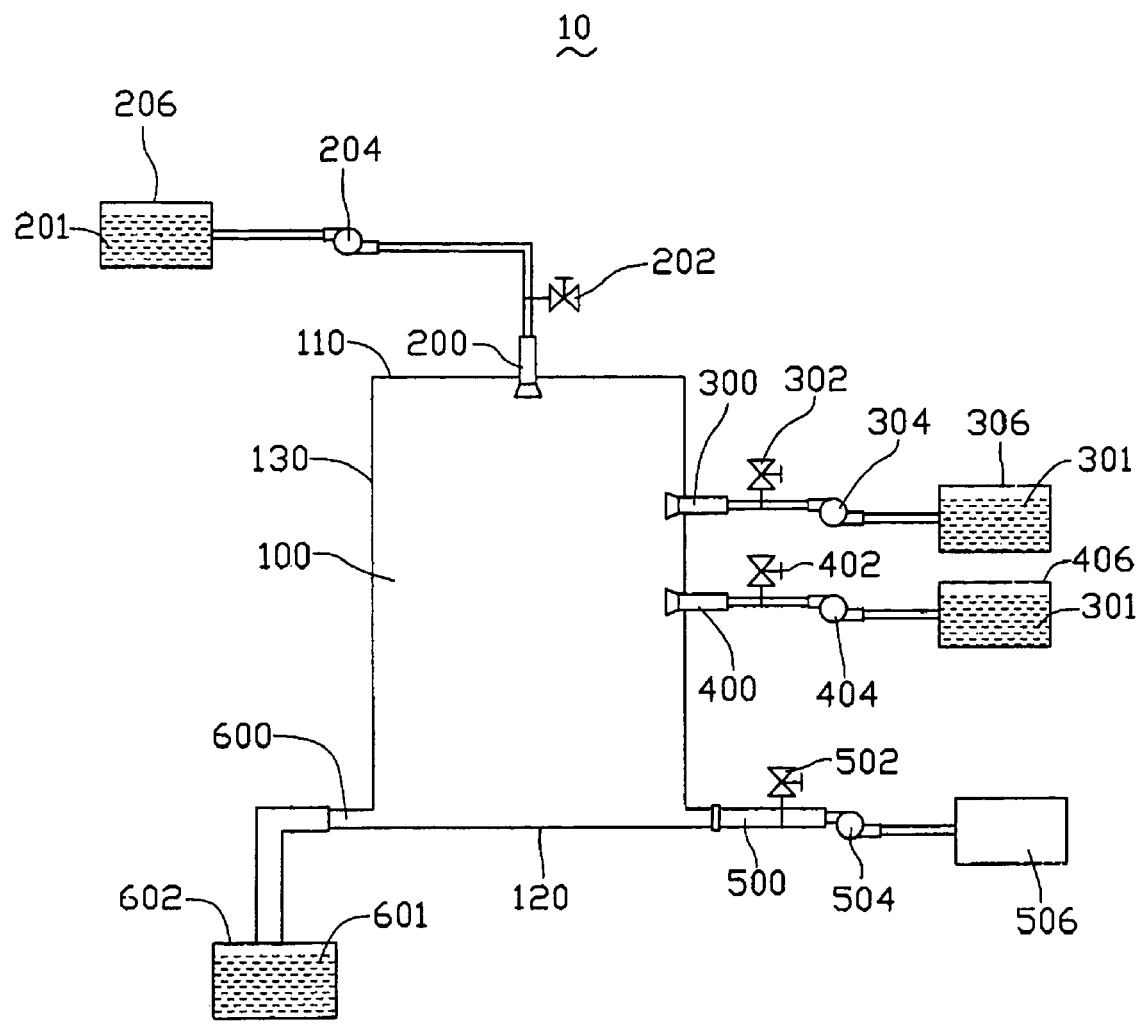
FIG. 1 is a schematic view of a nanopowder synthesis apparatus in accordance with a preferred embodiment.

Referring to FIG. 1, a nanopowder synthesis apparatus 10 according to a preferred embodiment is provided. The nanopowder synthesis apparatus 10 comprises a reaction chamber 100, the reaction chamber 100 having a top portion 110, a bottom portion 120 opposite to the top portion 110, a sidewall 130 adjoining the top portion 110 and the bottom portion 120, an inlet 500, and an outlet 600 opposite to the inlet 500; a first sprayer 200 communicated with the reaction chamber 100 configured for spraying a first reactant 201 into the reaction chamber 100 along a first direction; and a second sprayer 300 and a third sprayer 400 communicated with the reaction chamber 100 respectively configured for spraying a second reactant 301 into the reaction chamber 100 along a second direction intersecting the first direction.

The first sprayer 200 coupled with a first container 206 via a first flow controller 202 and a first pump 204. The first container 206 is configured for containing the first reactant 201. The second and third sprayers 300, 400 are coupled with second and third containers 306, 406 via second and third flow controllers 302, 402 and second and third pumps 304, 404. The second and third containers 306 are configured for containing the second reactant 301. The inlet 500 is coupled with a fourth container 506 via a fourth flow controller 502 and a fourth pump 504. The fourth container 506 is configured for containing the inert gas (not shown), such as argon gas (Ar), nitrogen gas ($N_2$), or a mixture of the two. The outlet 600 is coupled with a collector 602 configured for collecting products of reaction. Fluxes, flow rates, and spraying swaths of the reactants 201, 301 can be controlled by the flow controllers 202, 302, and 402 respectively.

In the preferred embodiment, the first sprayer 200 is formed in the top portion 110 configured for spraying the first reactant 201 into the reaction chamber 100 along a first direction from top to bottom; the second and third sprayers 300, 400 are formed in the sidewall 130 configured for spraying the second reactants 301 into the reaction chamber 100 along a second direction to react with the first reactant 201. The second direction is substantially perpendicular to the first direction. The inlet 500 is formed at the bottom of the sidewall 130 configured for blowing the inert gas into the reaction chamber 100 along the bottom portion 120. The outlet 600 is formed at the bottom of the sidewall 130 configured for releasing products of reaction therefrom. In other embodiments, the first sprayer 200 can be formed in the sidewall 130 configured for spraying the first reactant 201 into the reaction chamber 100 along a first direction, the second and third sprayers 300, 400 also can be formed in the sidewall 130 configured for spraying the second reactants 301 into the reaction chamber 100 along a second direction to react with the first reactant 201. The first and second directions can be intersecting at any suitable angle. For example, the first sprayer 200 can be formed in the sidewall 130 opposite to the second and third sprayers 300, 400. Furthermore, the outlet 600 can be formed at one end of the bottom portion 120 distal from the inlet 500.

It is noted that, the aforesaid nanopowder synthesis apparatus 10 can be applied in a variety of reactions for forming nanopowders, such as spraying three different reactants from the three sprayers 200, 300, and 400 respectively, spraying two different reactants from the first and second sprayers 200 and 300 respectively, or spraying a first reactant from the first sprayer 200 and spraying a same second reactant from both the second and third sprayers 300 and 400. Furthermore, the nanopowder synthesis apparatus 10 may comprises more sprayers for spraying more reactants, or merely comprises two sprayers for spraying two reactants, to react with each other for forming nanopowders.

Figure 2:
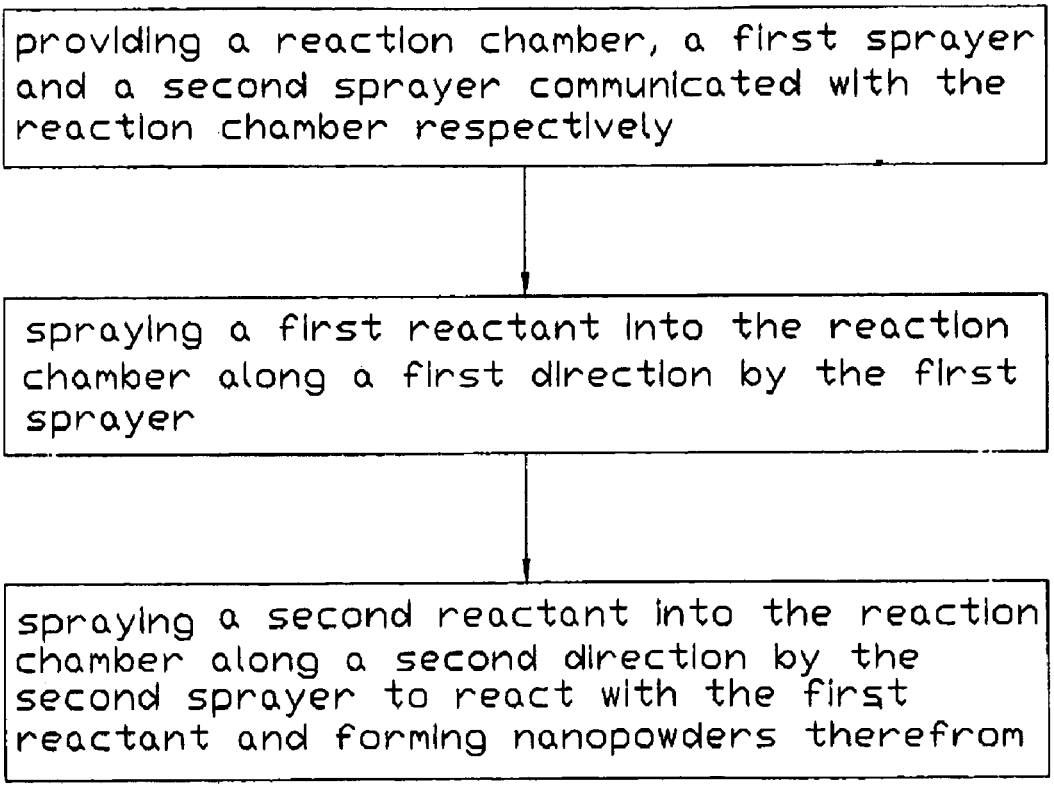
FIG. 2 is a schematic flow chart of a method for synthesizing nanopowders using the apparatus of FIG. 1.

Referring to FIG. 2, a nanopowder synthesis method according to another preferred embodiment is provided. The method comprises the steps of:

providing a reaction chamber, a first sprayer and a second sprayer communicated with the reaction chamber respectively, the reaction chamber having a top portion, a bottom portion opposite to the top portion, a sidewall adjoining the top portion and the bottom portion;

spraying a first reactant into the reaction chamber along a first direction by the first sprayer; and spraying a second reactant into the reaction chamber along a second direction intersecting to the first direction by the second sprayer to react with the first reactant and forming nanopowders therefrom.

Referring to FIG. 1, the nanopowder synthesis method in accordance with the preferred embodiment is described in detail below including with reference to various embodiments thereof.

Providing a reaction chamber 100, a first sprayer 200, a second sprayer 300, and a third sprayer 400 communicated with the reaction chamber 100 respectively, the reaction chamber 100 having a top portion 110, a bottom portion 120 opposite to the top portion 110, a sidewall 130 adjoining the top portion 110 and the bottom portion 120, an inlet 500, and an outlet 600 opposite to the inlet 500. The first sprayer 200 coupled with a first container 206 via a first flow controller 202 and a first pump 204. The first container 206 is configured for containing the first reactant 201. The second and third sprayers 300, 400 are coupled with second and third containers 306, 406 via second and third flow controllers 302, 402 and second and third pumps 304, 404. The second and third containers 306 are configured for containing the second reactant 301. The inlet 500 is coupled with a fourth container 506 via a fourth flow controller 502 and a fourth pump 504. The fourth container 506 is configured for containing an inert gas (not shown), such as argon gas (Ar), nitrogen gas ($N_2$), or a mixture of the two. The outlet 600 is coupled with a collector 602 configured for collecting products of reaction. In the preferred embodiment, a water solution of $M^{m+}$ (M denotes metals such as Ag, Au and etc., m=1, 2, or 3) ions as the first reactant 201, a water solution of $BH_4^-$ (Borohydride Anion) anions as the second reactant 301.

Spraying the first reactant 201 into the reaction chamber 100 along a first direction by the first sprayer 200. Operating the first pump 204 and pressing the first reactant 201 into the first sprayer 200 through the first flow controller 202, and spraying the first reactant 201 into the reaction chamber 100 from the first sprayer 200. In the preferred embodiment, the first sprayer 200 spraying the water solution of $M^{m+}$ ions along a first direction from the top portion 110 to the bottom portion 120 of the reaction chamber 100.

Spraying the second reactant 301 into the reaction chamber 100 along a second direction intersecting to the first direction by the second and third sprayers 300, 400 to react with the first reactant 201 and forming nanopowders therefrom. Operating the second and third pumps 304, 404 and pressing the second reactant 301 into the second and third sprayers 300, 400 through the second and third flow controllers 302, 402 respectively, and spraying the second reactant 301 into the reaction chamber 100 from the second and third sprayers 300, 400. In the preferred embodiment, the second and third sprayers 300, 400 spraying the water solution of $BH_4^-$ anions along a second direction substantially perpendicular to the first direction therefrom. The sprayed first and second reactants 201, 301 thereby impinging against each other at high speed, and reacting with each other in the reaction chamber 100. Reaction of the sprayed first reactant 201 with the sprayed second reactant 301 can be shown as following reaction formula:

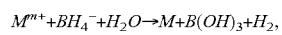

$$M^{m+}+BH_4^-+H_2O \rightarrow M+B(OH)_3+H_2,$$

nanopowders (not shown) of M are thereby formed, the nanopowders have an average grain size in the range from 50 nanometers to 150 nanometers. A mixture 601 of products of the reaction with the nanopowders suspended in is then released to the collector 602 from the outlet 600.

In operation, fluxes, flow rates, and spraying swaths of the first and second reactants 201, 301 can be controlled by the flow controllers 202, 302, and 402 respectively. Furthermore, the inert gas in the fourth container 506 are pressing to the inlet 500 by the fourth pump 504 and the fourth flow controller 502, and blowing from the inlet 500 to the outlet 600 along a bottom portion of the reaction chamber 100. Thereby the mixture 601 with the nanopowders suspended therein can be released from the outlet 600 more efficiently In addition, the present nanopowder synthesis method further comprises a separating step for separating the nanopowders from the mixture 601. The separating step can be performed by any suitable separating method, such as a filtering separation method, or a centrifugal separation method. In the preferred embodiment, the separating step is performed by a filtering separation method.

As stated above, the nanopowder synthesis apparatus and method in accordance with a preferred embodiment employs sprayers for spraying reactants, the sprayed reactants thereby impinging against each other at high speed, and forming nanopowders by reacting with each other, the sprayed reactants have high specific area and react with each other via high efficiency impact, liquid-liquid reaction on the micro level may carry through uniformly, and grain sizes of the nanopowders are very small.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A nanopowder synthesis apparatus comprising:
   a reaction chamber;
   a first sprayer communicated with the reaction chamber and configured for spraying a first reactant into the reaction chamber along a first direction; and
   a second sprayer communicated with the reaction chamber and configured for spraying a second reactant into the reaction chamber along a second direction intersecting the first direction.

2. The nanopowder synthesis apparatus in accordance with claim 1, wherein the reaction chamber has a top portion, a bottom portion opposite to the top portion, a sidewall adjoining the top portion and the bottom portion.

3. The nanopowder synthesis apparatus in accordance with claim 2, wherein the reaction chamber further comprises an inlet and an outlet formed opposite each other at the bottom of the sidewall.

4. The nanopowder synthesis apparatus in accordance with claim 2, wherein the first sprayer is formed in the top portion, and the second sprayer is formed in the sidewall.

5. The nanopowder synthesis apparatus in accordance with claim 2, wherein the first sprayer and the second sprayer are both formed in the sidewall.

6. The nanopowder synthesis apparatus in accordance with claim 1, wherein the first and second sprayers are each communicated with a pump.

7. The nanopowder synthesis apparatus in accordance with claim 1, wherein the first and second sprayers are each communicated with a flow controller.

8. The nanopowder synthesis apparatus in accordance with claim 1, wherein the first and second directions are substantially perpendicular to each other.

9. A nanopowder synthesis method comprising the steps of:
   providing a reaction chamber, a first sprayer and a second sprayer communicated with the reaction chamber respectively;
   spraying a first reactant into the reaction chamber along a first direction by the first sprayer; and
   spraying a second reactant into the reaction chamber along a second direction by the second sprayer to react with the first reactant and forming nanopowders therefrom.

10. The nanopowder synthesis method in accordance with claim 9, wherein the reaction chamber has a top portion, a bottom portion opposite to the top portion, a sidewall adjoining the top portion and the bottom portion.

11. The nanopowder synthesis method in accordance with claim 10, wherein the method further comprises providing an inlet and an outlet formed opposite each other at the bottom of the sidewall.

12. The nanopowder synthesis method in accordance with claim 11, wherein the method further comprises releasing products of reaction from the outlet.

13. The nanopowder synthesis method in accordance with claim 11, wherein the method further comprises blowing an inert gas from the inlet to the outlet.

14. The nanopowder synthesis method in accordance with claim 13, wherein the inert gas is selected from group comprising argon gas, nitrogen gas, and a mixture of the two.

15. The nanopowder synthesis method in accordance with claim 9, wherein the method further comprises a separating step of separating out the nanopowders from a mixture in which the nanopowders are suspended.

16. The nanopowder synthesis method in accordance with claim 15, wherein the separating step is performed by one of a filtering separation method and a centrifugal separation method.

17. The nanopowder synthesis method in accordance with claim 9, wherein the nanopowders have an average grain size in the range from 60 nanometers to 150 nanometers.

* * * * *

UNITED STATES PATENT AND TRADEMARK OFFICE
CERTIFICATE OF CORRECTION

| | | |
|---|---|---|
| PATENT NO. | : 7,611,649 B2 | Page 1 of 1 |
| APPLICATION NO. | : 11/432207 | |
| DATED | : November 3, 2009 | |
| INVENTOR(S) | : Hsiao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Twelfth Day of October, 2010

David J. Kappos
*Director of the United States Patent and Trademark Office*